(12) United States Patent
Wang et al.

(10) Patent No.: US 8,897,181 B2
(45) Date of Patent: Nov. 25, 2014

(54) MULTI-RADIO COEXISTENCE

(71) Applicants: Jibing Wang, San Diego, CA (US); Tamer Adel Kadous, San Diego, CA (US); Ashok Mantravadi, San Diego, CA (US)

(72) Inventors: Jibing Wang, San Diego, CA (US); Tamer Adel Kadous, San Diego, CA (US); Ashok Mantravadi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 186 days.

(21) Appl. No.: 13/625,373

(22) Filed: Sep. 24, 2012

(65) Prior Publication Data

US 2013/0155884 A1   Jun. 20, 2013

Related U.S. Application Data

(60) Provisional application No. 61/576,296, filed on Dec. 15, 2011.

(51) Int. Cl.
*H04B 3/40* (2006.01)

(52) U.S. Cl.
USPC ......... 370/282; 370/276; 370/277; 370/310.2

(58) Field of Classification Search
None
See application file for complete search history.

(56) References Cited

U.S. PATENT DOCUMENTS

| | | | |
|---|---|---|---|
| 8,711,740 B2* | 4/2014 | Banister et al. | 370/280 |
| 2007/0081455 A1* | 4/2007 | Kashima et al. | 370/229 |
| 2007/0111681 A1 | 5/2007 | Alberth et al. | |
| 2008/0146268 A1* | 6/2008 | Gandhi et al. | 455/552.1 |
| 2008/0227488 A1 | 9/2008 | Zhu et al. | |
| 2009/0047998 A1 | 2/2009 | Alberth, Jr. | |
| 2009/0129367 A1* | 5/2009 | Bitran | 370/350 |
| 2010/0291963 A1 | 11/2010 | Patel et al. | |
| 2011/0237289 A1 | 9/2011 | Fodor et al. | |
| 2011/0263216 A1 | 10/2011 | Lee et al. | |
| 2013/0122827 A1* | 5/2013 | Ali et al. | 455/77 |
| 2013/0155884 A1* | 6/2013 | Wang et al. | 370/252 |

FOREIGN PATENT DOCUMENTS

JP   2011135341 A   7/2011

OTHER PUBLICATIONS

International Search Report and Written Opinion—PCT/US2012/069288—ISA/EPO—Jan. 30, 2013.

* cited by examiner

*Primary Examiner* — Robert Wilson
(74) *Attorney, Agent, or Firm* — Seyfarth Shaw LLP

(57) ABSTRACT

To comport with specific absorption rate (SAR) requirements for a transmitting multi-radio mobile device, transmissions of the multiple radios may be duplexed to ensure compliance with communication regulations. Duplexing of transmissions may occur if overall transmissions exceed a particular threshold value. The duplexing may be opportunistic or deterministic.

16 Claims, 11 Drawing Sheets

MULTI-RADIO COEXISTENCE

CROSS REFERENCE TO RELATED APPLICATION

This application claims the benefit under 35 U.S.C. §119(e) to United States Provisional Patent Application No. 61/576,296 entitled "MULTI-RADIO COEXISTENCE" filed on Dec. 15, 2011, the disclosure of which is expressly incorporated herein by reference in its entirety.

BACKGROUND

1. Field

Aspects of the present disclosure relate generally to multi-radio techniques and, more specifically, to coexistence techniques for multi-radio devices.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith. It is noted that Bluetooth and some Wireless local area network (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNodeB of interference seen by the UE on the downlink. Furthermore, the eNodeB may be able to estimate interference at the UE using a downlink error rate. In some instances, the eNodeB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNodeB. As a result, unilateral action on the part of the UE (e.g., moving the uplink signal to a different channel) may be thwarted by the eNodeB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher than reflected in the measurement reports of the new channel based on Reference Signal Received Power (RSRP) to the eNodeB. Hence, a ping-pong effect of being transferred back and forth between the corrupted channel and the desired channel can happen if the eNodeB uses RSRP reports to make handover decisions.

Other unilateral action on the part of the UE, such as simply stopping uplink communications without coordination of the eNodeB may cause power loop malfunctions at the eNodeB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

In one aspect, a method of wireless communication is disclosed. The method includes measuring a transmit power from at least one radio access technology (RAT). The method also includes duplexing transmissions of a first RAT with transmissions of a second RAT when the measured transmit powers exceed a value associated with a specific absorption rate (SAR) threshold value.

Another aspect discloses wireless communication having a memory and at least one processor coupled to the memory. The processor(s) is configured to measure a transmit power from at least one radio access technology (RAT). The processor(s) is also configured to duplex transmissions of a first RAT with transmissions of a second RAT when the measured transmit powers exceed a value associated with a specific absorption rate (SAR) threshold value.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of measuring a transmit power from at least one radio access technology (RAT). The program code also causes the processor(s) to duplex transmissions of a first RAT with transmissions of a second RAT when the measured transmit powers exceed a value associated with a specific absorption rate (SAR) threshold value.

Another aspect discloses an apparatus including means for measuring a transmit power from at least one radio access technology (RAT). The apparatus also includes means for duplexing transmissions of a first RAT with transmissions of a second RAT when the measured transmit powers exceed a value associated with a specific absorption rate (SAR) threshold value.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
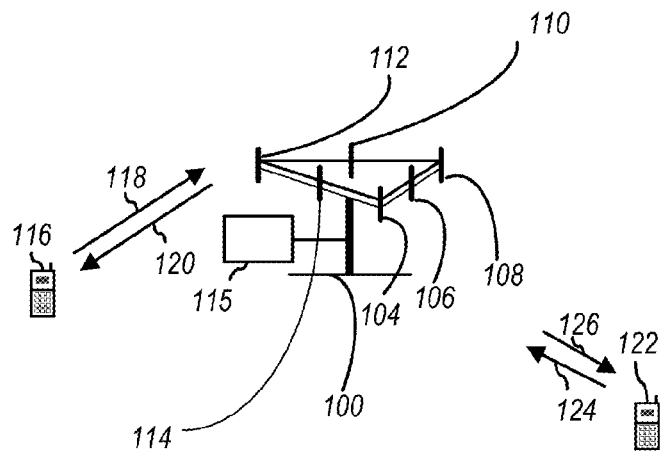
FIG. 1 illustrates a multiple access wireless communication system according to one aspect.

Various aspects of the disclosure provide techniques to energy transmission issues in multi-radio devices. In certain devices, such as mobile communication devices, governmental, or other bodies, such as the United States Federal Communication Commission (FCC), may regulate the amount of energy a device can transmit. For example, the FCC regulates the measure of the amount of radio frequency energy absorbed by the human body when using a mobile device. The amount of absorbed energy is referred to as a specific absorption rate (SAR) value. To ensure safe exposure, the FCC requires cell phone manufacturers to ensure that their phones comply with SAR threshold limits during operation. In a multi-radio mobile device, if transmissions of a first radio access technology (RAT) overlap with transmissions of a second (or more) RAT(s), a SAR threshold limit may be exceeded. To avoid exceeding a SAR limit, transmissions of multiple radios may be duplexed in a manner described below.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). CDMA2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNodeB) includes a computer 115 that has processing resources and memory resources to manage the LTE communications by allocating resources and parameters, granting/denying requests from user equipment, and/or the like. The eNodeB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In a frequency division duplex (FDD) system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNodeB. In this aspect, respective antenna groups are designed to communicate to UEs in a sector of the areas covered by the eNodeB 100.

In communication over the downlinks 120 and 126, the transmitting antennas of the eNodeB 100 utilize beamforming to improve the signal-to-noise ratio of the uplinks for the different UEs 116 and 122. Also, an eNodeB using beamforming to transmit to UEs scattered randomly through its coverage causes less interference to UEs in neighboring cells than a UE transmitting through a single antenna to all its UEs.

An eNodeB can be a fixed station used for communicating with the terminals and can also be referred to as an access point, base station, or some other terminology. A UE can also be called an access terminal, a wireless communication device, terminal, or some other terminology.

Figure 2:
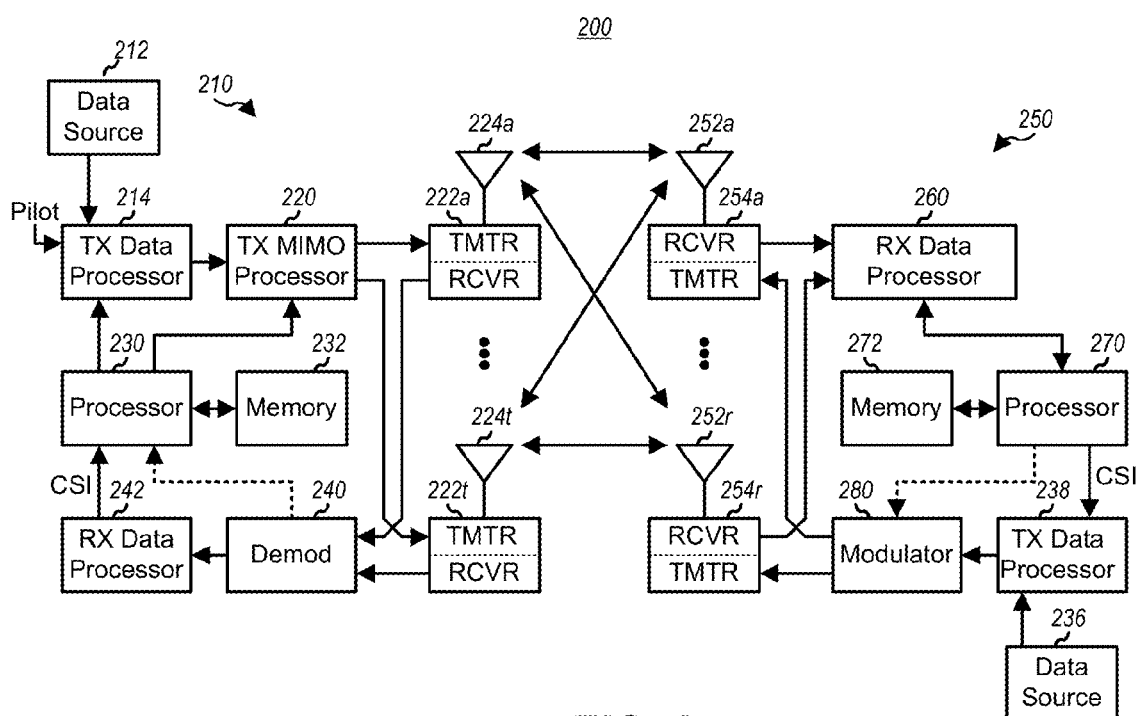
FIG. 2 is a block diagram of a communication system according to one aspect.

FIG. 2 is a block diagram of an aspect of a transmitter system 210 (also known as an eNodeB) and a receiver system 250 (also known as a UE) in a MIMO system 200. In some instances, both a UE and an eNodeB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNodeB to extract transmit beamforming gain on the downlink when multiple antennas are available at the eNodeB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
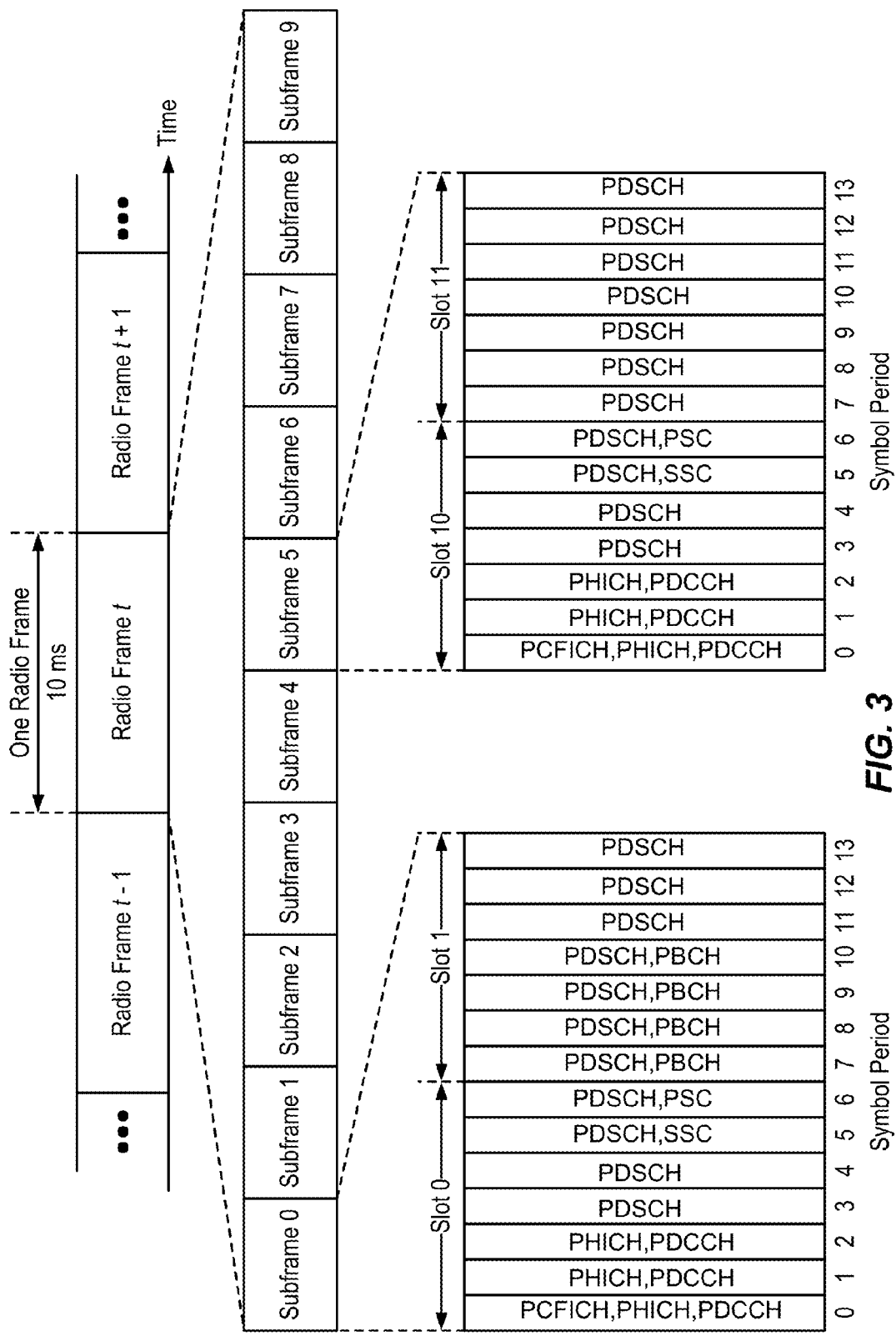
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a Primary Synchronization Signal (PSS) and a Secondary Synchronization Signal (SSS) for each cell in the eNodeB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Cell-specific Reference Signal (CRS) for each cell in the eNodeB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNodeB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

Figure 4:
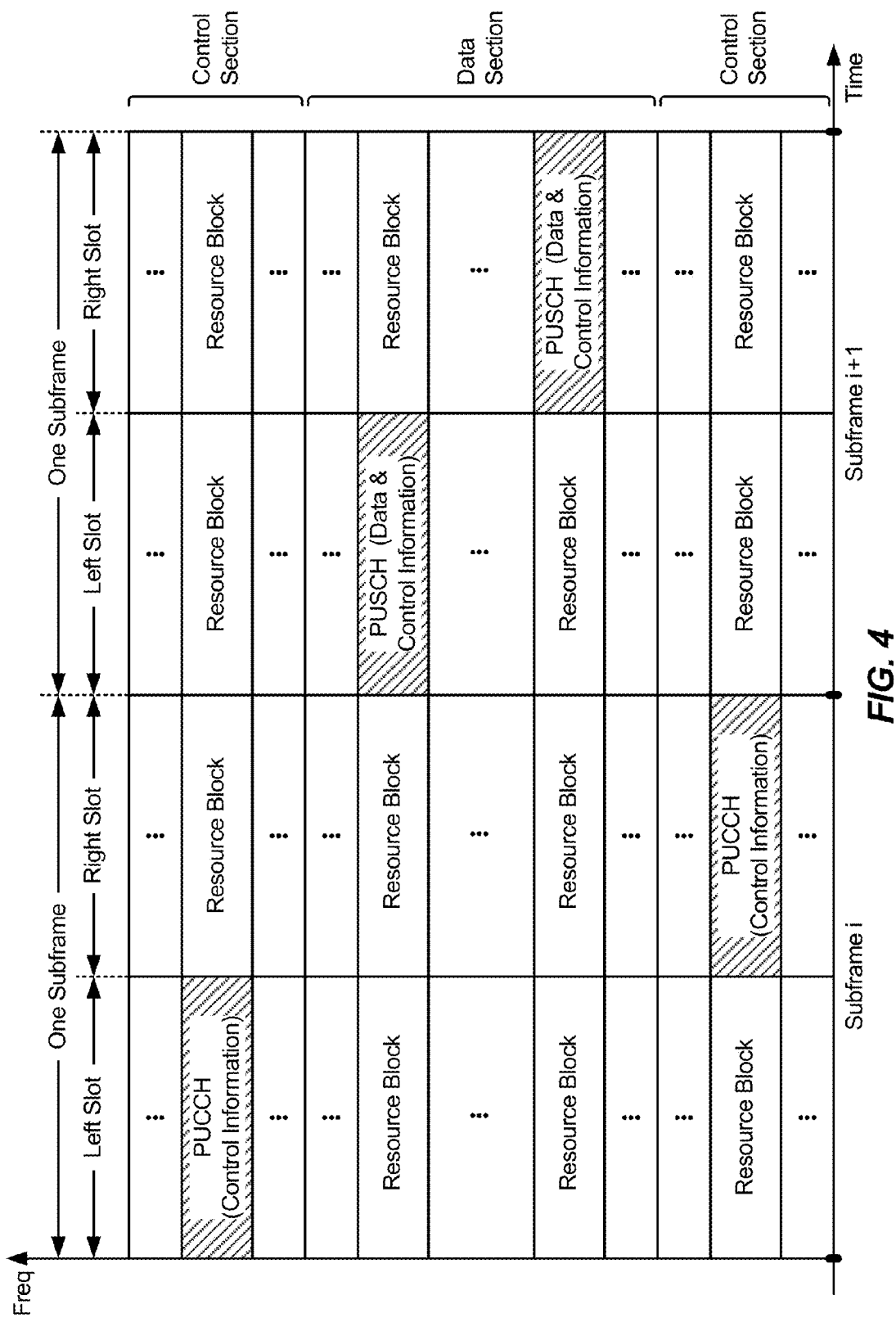
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
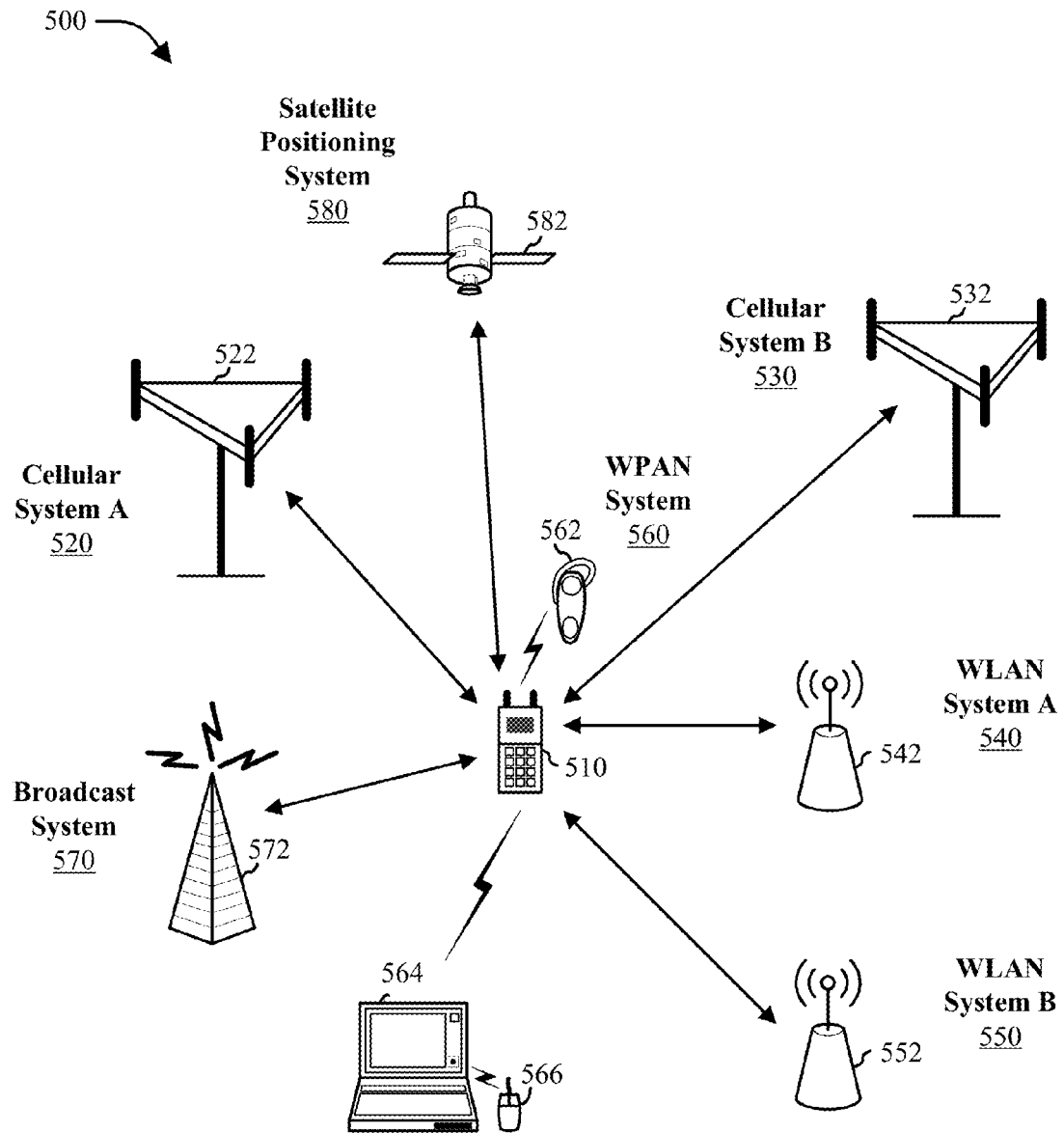
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "$3^{rd}$ Generation Partnership Project" (3GPP). cdma2000 and UMB are described in documents from an organization named "$3^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
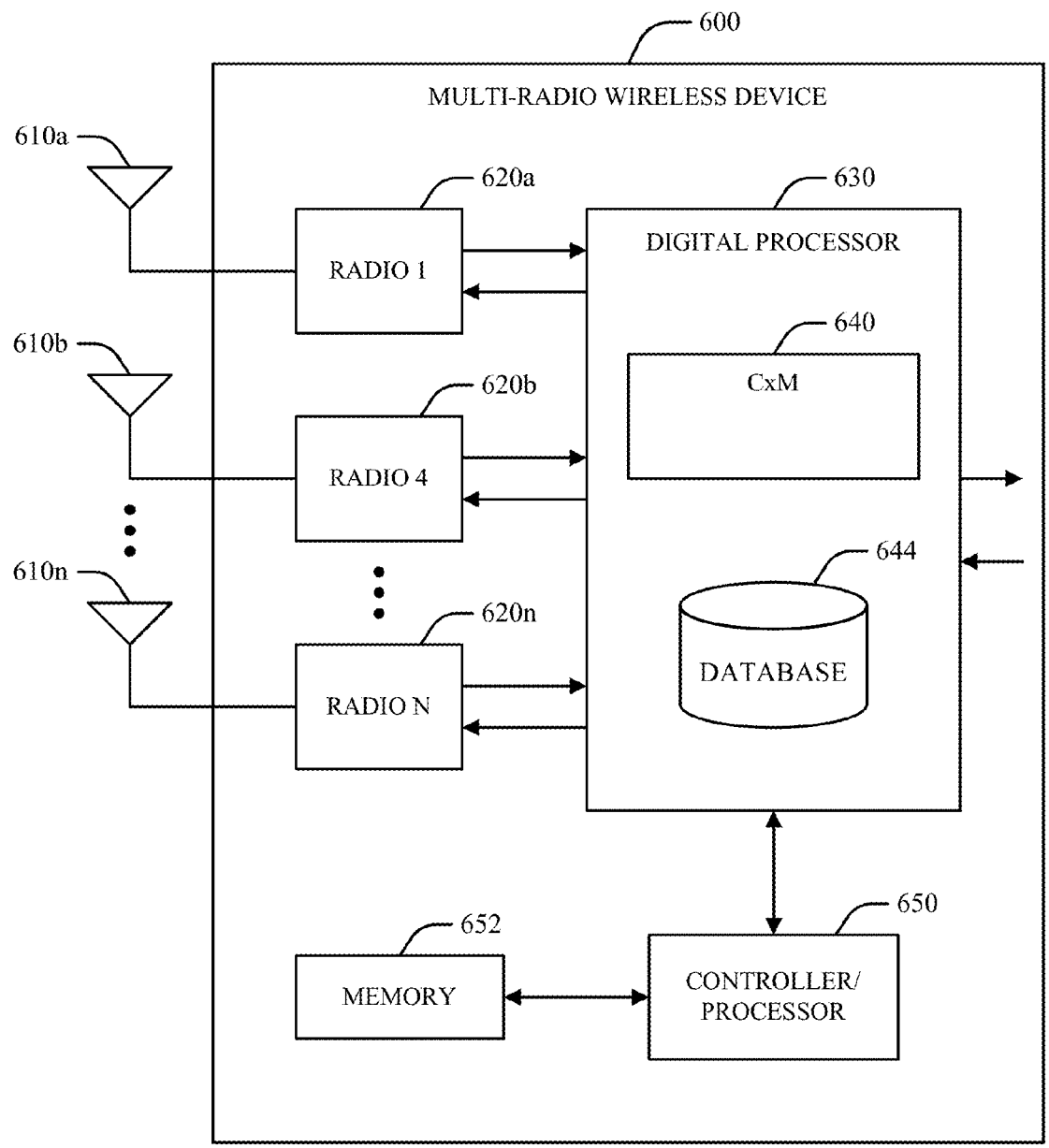
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver; or the like. In one example, the digital processor 630 can include a coexistence manager (CxM) 640 that can control operation of the radios 620 in order to improve the performance of the wireless device 600 as generally described herein. The coexistence manager 640 can have access to a database 644, which can store information used to control the operation of the radios 620. As explained further below, the coexistence manager 640 can be adapted for a variety of techniques to decrease interference between the radios. In one example, the coexistence manager 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
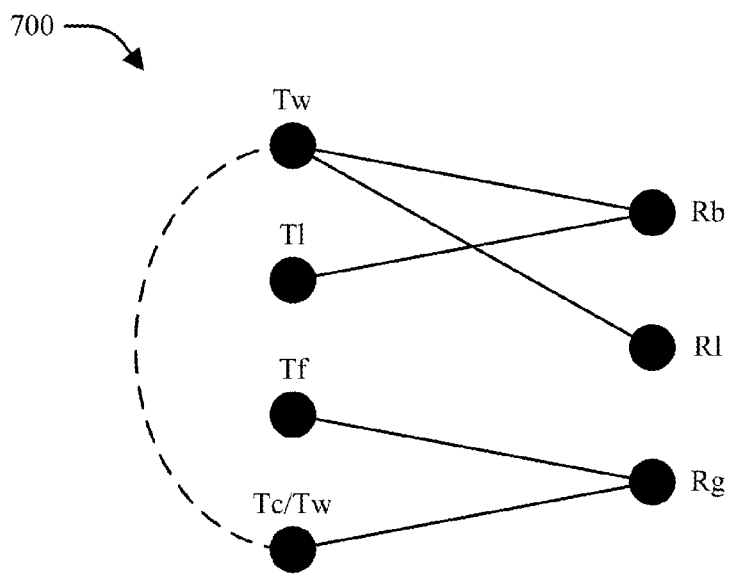
FIG. 7 is graph showing respective potential collisions between seven example radios in a given decision period.
Figure 10:
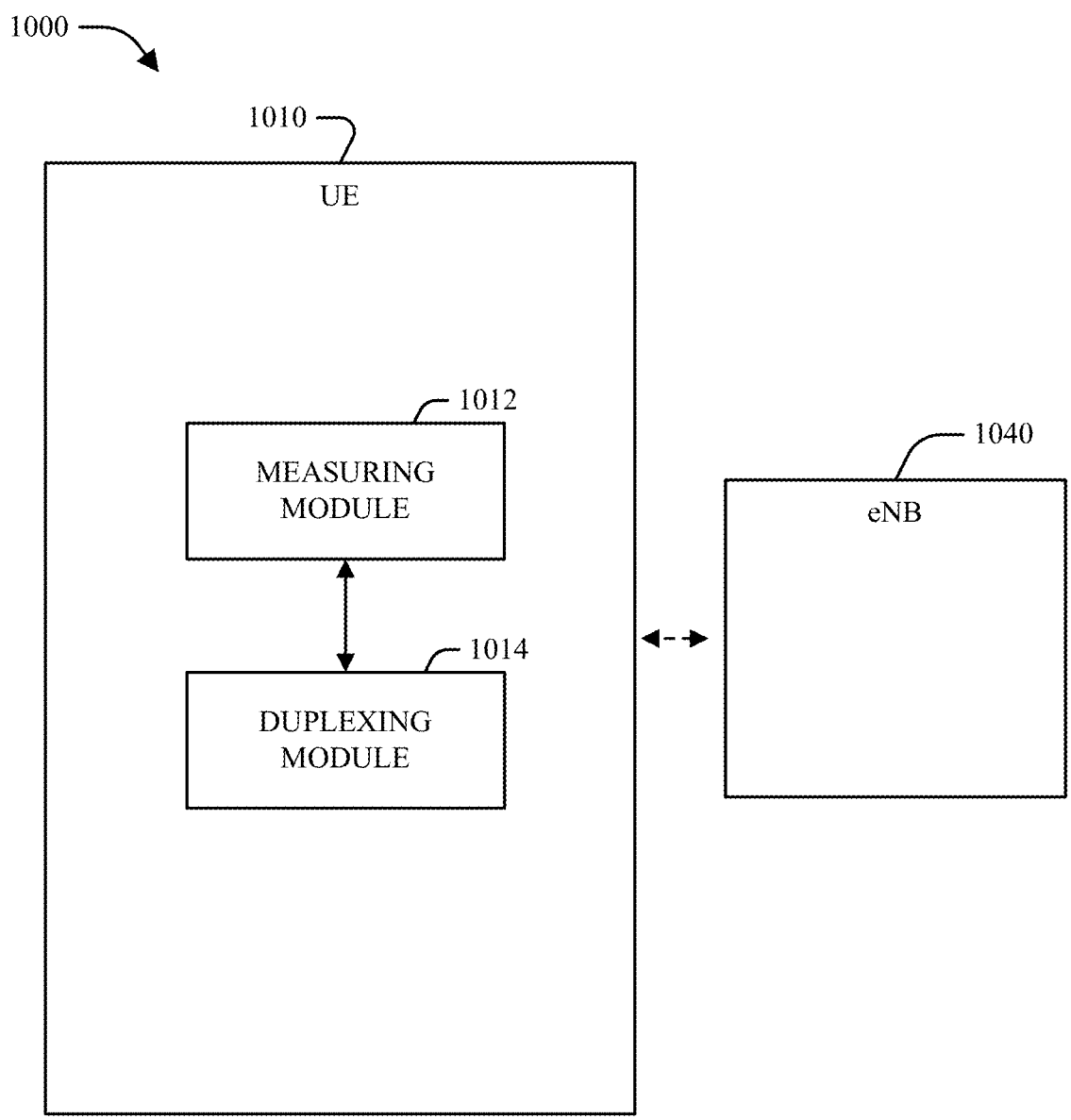
FIG. 10 is a block diagram of a system for providing support within a wireless communication environment for multi-radio coexistence management according to one aspect of the present disclosure.

In an aspect, the coexistence manager 640 can manage operation of respective radios 620 utilized by wireless device 600 in order to avoid interference and/or other performance degradation associated with collisions between respective radios 620. coexistence manager 640 may perform one or more processes, such as those illustrated in FIG. 10. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
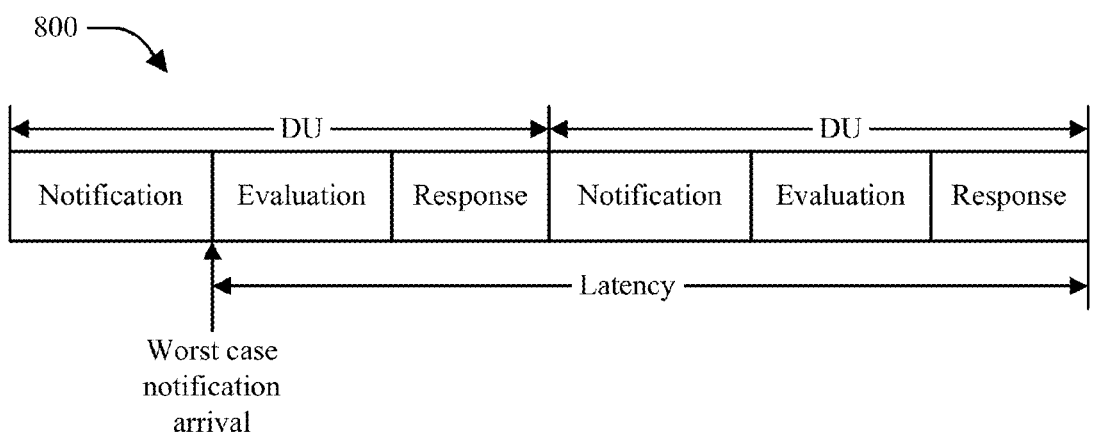
FIG. 8 is a diagram showing operation of an example Coexistence Manager (CxM) over time.

In one aspect, an example coexistence manager 640 can operate in time in a manner such as that shown by diagram 800 in FIG. 8. As diagram 800 illustrates, a timeline for coexistence manager operation can be divided into Decision Units (DUs), which can be any suitable uniform or non-uniform length (e.g., 100 µs) where notifications are processed, and a response phase (e.g., 20 µs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
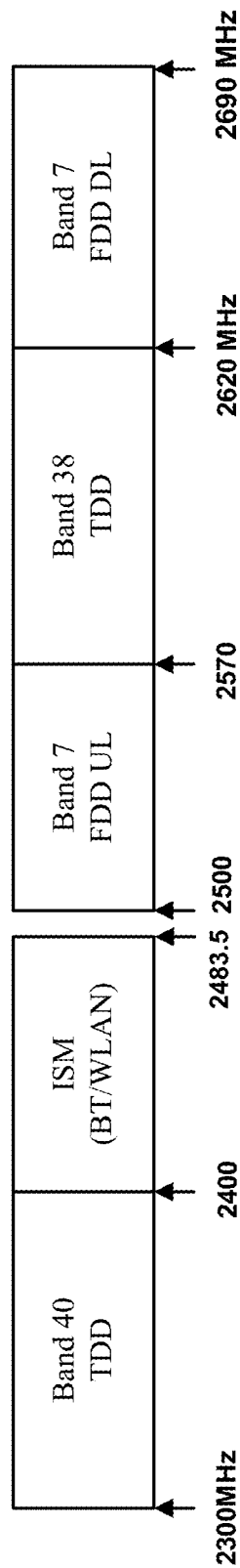
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNodeB can use to make inter-frequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNodeB can in some cases handover the UE back to the problematic channel for load balancing purposes. In any case, it can be appreciated that existing techniques do not facilitate use of the bandwidth of the problematic channel in the most efficient way.

Referring to FIG. 10, a block diagram of a system 1000 for providing support within a wireless communication environment for multi-radio coexistence management is illustrated. In an aspect, the system 1000 can include one or more UEs 1010 and/or eNodeBs 1040, which can engage in uplink and/or downlink communications, and/or any other suitable communication with each other and/or any other entities in the system 1000. In one example, the UE 1010 and/or eNodeB 1040 can be operable to communicate using a variety resources, including frequency channels and sub-bands, some of which can potentially be colliding with other radio resources (e.g., a broadband radio such as an LTE modem). Thus, the UE 1010 can utilize various techniques for managing coexistence between multiple radios utilized by the UE 1010, as generally described herein.

To mitigate at least the above shortcomings, the UE 1010 can utilize respective features described herein and illustrated by the system 1000 to facilitate support for multi-radio coexistence within the UE 1010. For example, a measuring module 1012, and a duplexing module 1014 can be provided. The measuring module measures a transmit power from at least one radio access technology (RAT). The duplexing module duplexes (using either time domain or frequency domain duplexing) transmissions of a first RAT with transmissions of a second RAT when the measured transmit powers exceeds a threshold value associated with a specific absorption rate (SAR) threshold value.

When multiple radios of a device are in use, and if each radio is transmitting at a sufficiently high power, then the combined radios may violate the SAR limit. Concurrent use cases include when a cellular (e.g., LTE, GSM, or TD-SCDMA) based radio access technology (RAT) and a WLAN (e.g., WiFi) based radio access technology are active at the same time. The concurrent use may cause the mobile device to exceed SAR limits. In particular, one example is for the softAP (soft access point) case, where the cellular radio is used as the backhaul link and WiFi is used as the access link to serve other stations. One aspect of the present disclosure is directed to power management so that a UE transmitting both WiFi and LTE signals complies with the SAR restrictions during operation.

Figure 11:
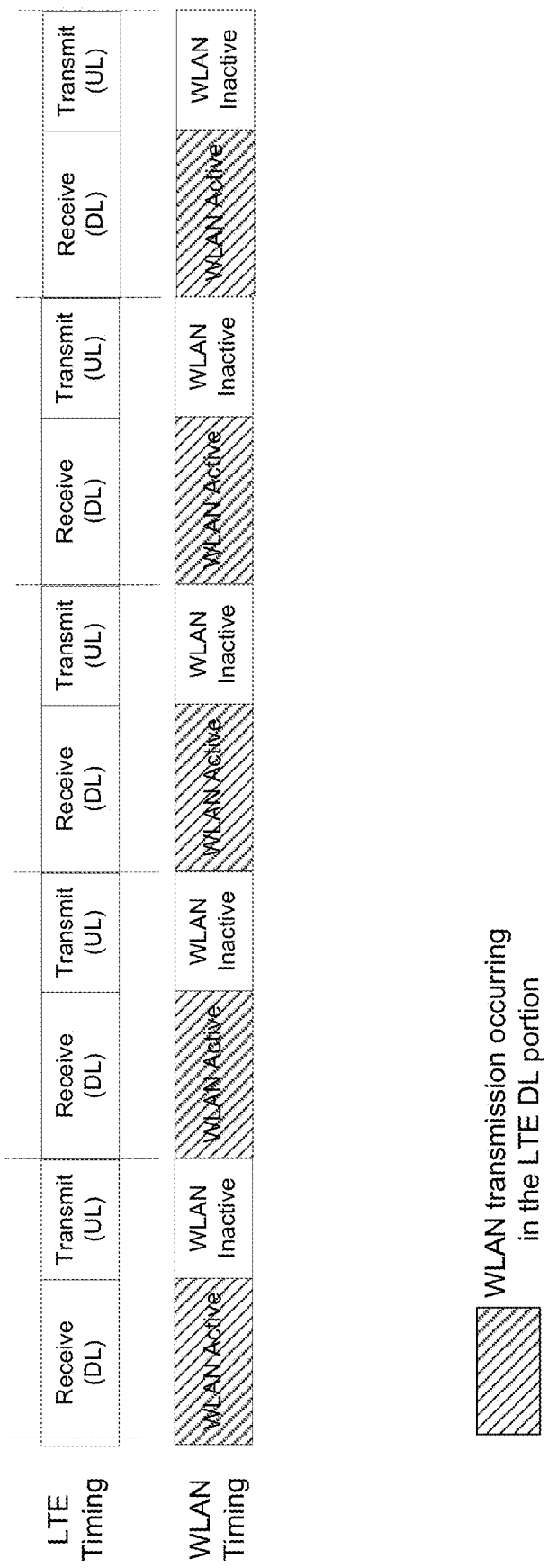
FIG. 11 is a block diagram illustrating duplexing transmissions.

FIG. 11 illustrates an example of power management applied to a wireless system having time division LTE (TD-LTE) and WLAN (e.g., WiFi) transmission. For TD-LTE, each LTE radio frame is configured with a certain downlink period (e.g., 3 ms) followed by a certain uplink period (e.g., 2 ms). In one aspect of the present disclosure, WLAN transactions occur only in the LTE downlink portion (e.g., WiFi is active). During the LTE uplink portion, WLAN is not transmitting (e.g., WiFi is inactive). By structuring the transmission of one radio during times when the other radio is not transmitting, the overall energy transmitted by the mobile device is reduced. This deterministic time division duplexing allows the WLAN and the LTE radios individually to transmit using full power and still permit the mobile device to comply with overall SAR requirements. In one aspect, the power management is opportunistic such that a first radio access technology transmits when a second radio access technology is not transmitting (such as a transmit time period which is not currently being used), in addition to the time periods when the UE is not configured to transmit on LTE.

Various techniques may be applied to ensure that WiFi is actively transmitting only during LTE downlink transmission time periods. In one technique, when the UE is operating as a WiFi station (STA), the UE WiFi transmitter in put in a power save mode. Once the station is in the power save mode, it can wake up during LTE downlink time periods to receive packets from the access point. In one aspect, the station knows the configured LTE timeline and the WiFi radio only retrieves downlink packets during the LTE downlink period by using power save (PS)-POLL messages. The (PS)-POLL message may be sent a guard time ahead of the start of the LTE uplink transmission to ensure there is sufficient time to receive the downlink packet and send the ACK before the LTE uplink transmission. By timing the PS-POLL messages this way, the WiFi transmitter only transmits uplink packets during the LTE downlink period.

In another technique, when the UE is operating as an access point (softAP), a (clear to send) CTS-to-Self message is used to ensure WiFi uplink transmissions occur during the LTE downlink time periods. In particular, before the LTE uplink period begins, the WiFi transmitter sends out a CTS-to-Self message, instructing the remote stations not to transmit to the UE during the LTE uplink time period. The CTS-to-Self message may be prepared a guard time ahead of the start of the LTE uplink transmission to ensure there is sufficient time for contention before the message is sent. The timing of the CTS-self message ensures that no acknowledgements are transmitted during the LTE uplink time period.

When the UE is operating as a peer-to-peer (P2P) group owner or client (e.g., in accordance with WiFi Direct operation), a Notice of Absence (NOA) message may be used to control the WiFi traffic. The notice of absence message is sent by the P2P group owner to the P2P client to notify the P2P-client about the absence periods during which P2P group owner will not be available. The P2P group owner can use the NOA message to indicate its periodic sleep/awake cycle to the P2P clients such that P2P group owner and clients only wake up during the LTE downlink portion (i.e., no WLAN traffic occurs during the LTE uplink portion). Additionally, the NOA message may be sent on every beacon. In particular, in one configuration, the NOA message is sent a guard time ahead of the uplink transmission and the message includes the duration of the absence.

In one aspect, WiFi uplink transmission is not always constrained to the LTE downlink time periods. In particular, the duplexing occurs only when the LTE transmission (TX) power is high enough so that if the WiFi radio transmits in the LTE uplink time period, the WiFi transmit power will exceed SAR limits. In a further aspect, if reducing the WiFi transmit power may lead to more throughput loss than constraining WiFi transmission to LTE downlink periods only, then WiFi is constrained to the LTE downlink time period. Although the previous discussion was primarily with respect to time division duplexing (TDD), the present disclosure is also applicable to frequency division duplexing (FDD). With FDD, the WiFi transmitter is permitted to send uplink packets when the LTE transmitter is not using its sub frames.

Figure 12:
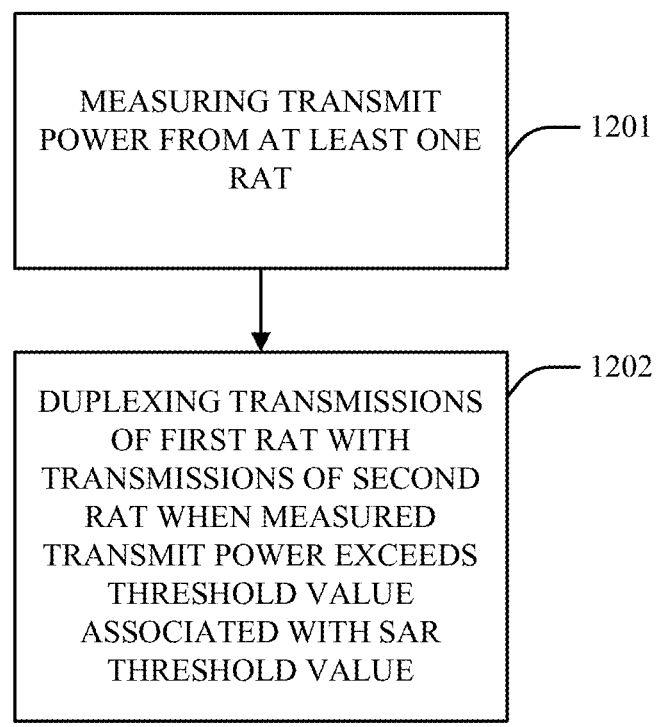
FIG. 12 is a block diagram illustrating power management according to one aspect of the present disclosure.

FIG. 12 illustrates a method for managing power. In block 1201, a UE measures the transmit power from at least one radio access technology (RAT). In block 1202, the UE duplexes transmissions of a first RAT with transmissions of a second RAT when the measured transmit power exceeds a threshold value associated with a SAR threshold value.

Figure 13:
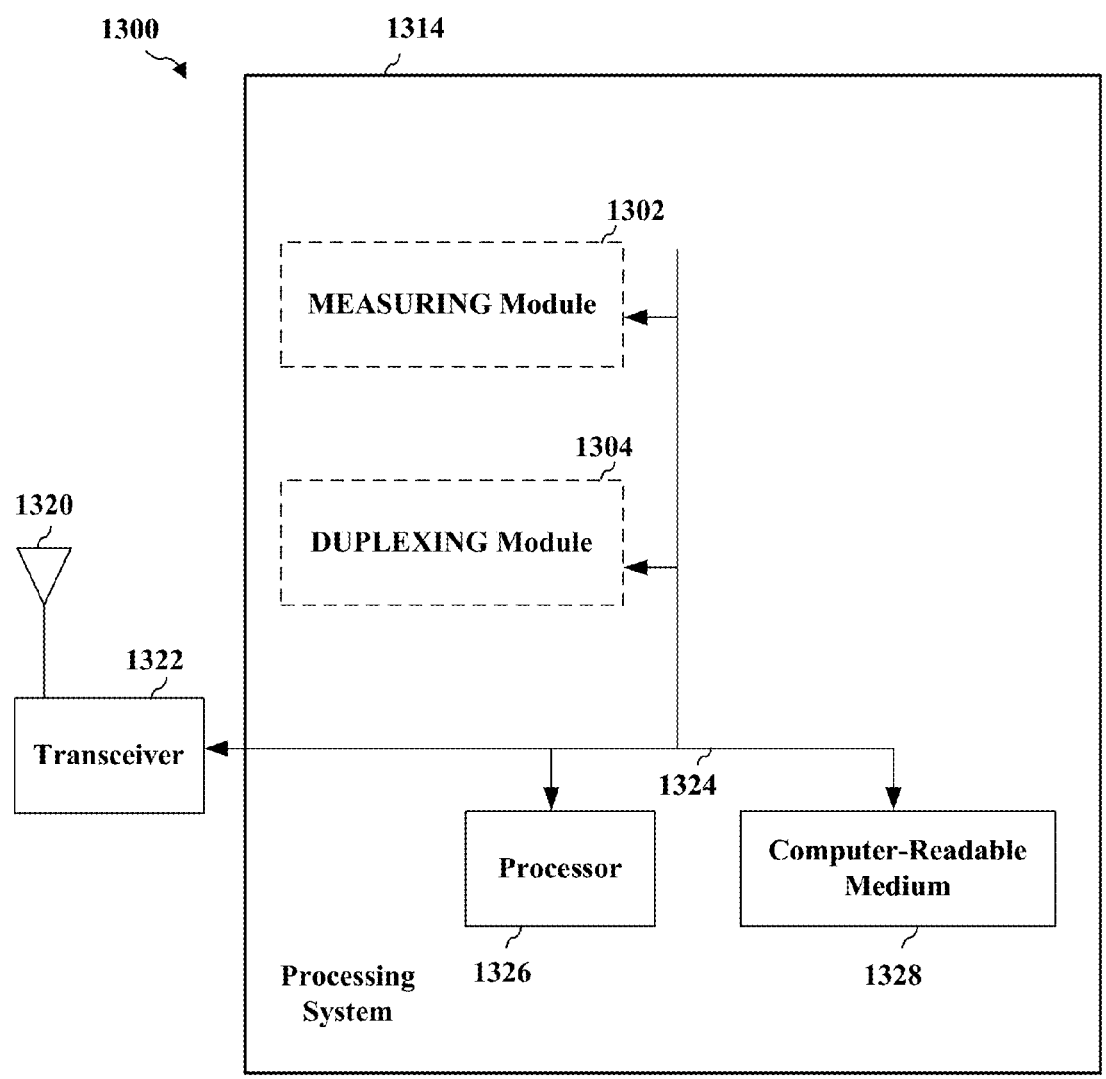
FIG. 13 is a diagram illustrating an example of a hardware implementation for an apparatus employing power management.

FIG. 13 is a diagram illustrating an example of a hardware implementation for an apparatus 1300 employing a power management system 1314. The power management system 1314 may be implemented with a bus architecture, represented generally by a bus 1324. The bus 1324 may include any number of interconnecting buses and bridges depending on the specific application of the power management system 1314 and the overall design constraints. The bus 1324 links together various circuits including one or more processors and/or hardware modules, represented by a processor 1326, a measuring module 1302, a duplexing module 1304 and a computer-readable medium 1328. The bus 1324 may also link various other circuits such as timing sources, peripherals, voltage regulators, and power management circuits, which are well known in the art, and therefore, will not be described any further.

The apparatus includes the power management system 1314 coupled to a transceiver 1322. The transceiver 1322 is coupled to one or more antennas 1320. The transceiver 1322 provides a means for communicating with various other apparatus over a transmission medium. The power management system 1314 includes the processor 1326 coupled to the computer-readable medium 1328. The processor 1326 is responsible for general processing, including the execution of software stored on the computer-readable medium 1328. The software, when executed by the processor 1326, causes the power management system 1314 to perform the various functions described supra for any particular apparatus. The computer-readable medium 1328 may also be used for storing data that is manipulated by the processor 1326 when executing software. The power management system 1314 further includes the measuring module 1302 for measuring a transmit power and the duplexing module 1304 for duplexing transmission of a first RAT with transmissions of a second RAT. The measuring module 1302 the duplexing module 1306 may be software modules running in the processor 1326, resident/stored in the computer readable medium 1328, one or more hardware modules coupled to the processor 1326, or some combination thereof. The power management system 1314 may be a component of the UE 250 and may include the memory 272 and/or the processor 270.

In one configuration, the apparatus 1300 for wireless communication includes means for measuring. The means may be the measuring module 1302 and/or the power management system 1314 of the apparatus 1300 configured to perform the functions recited by the measuring means. In one aspect, the aforementioned means for measuring may be the processor 270, memory 272, coexistence manager 640, and/or measuring module 1012 configured to perform the functions recited by the aforementioned means.

In one configuration, the apparatus 1300 for wireless communication includes means for duplexing. The means may be the duplexing module 1304 and/or the power management system 1314 of the apparatus 1300 configured to perform the functions recited by the duplexing means. In one aspect, the aforementioned means for duplexing may be the processor 270, memory 272, coexistence manager 640, and/or duplexing module 1014 configured to perform the functions recited by the aforementioned means. In another aspect, the aforementioned means may be any module or any apparatus configured to perform the functions recited by the aforementioned means.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications in a user equipment, said method comprising:
    measuring a transmit power from at least one radio access technology (RAT); and
    duplexing transmissions of a first RAT with transmissions of a second RAT, such that the first RAT transmits when the second RAT is not transmitting, when the measured transmit powers exceed a value associated with a specific absorption rate (SAR) threshold value and when reducing the transmit power from at least one RAT would result in lower throughput than duplexing the transmissions of the first RAT with the transmission of the second RAT.

2. The method of claim 1, in which the measuring comprises measuring a first transmit power from the first RAT and measuring a second transmit power from the second RAT; and
    in which duplexing further comprises duplexing transmissions of the first RAT with transmissions of the second RAT when a sum of the measured transmit powers exceeds the specific absorption rate (SAR) threshold value.

3. The method of claim 1, in which duplexing is time division duplexing.

4. The method of claim 3 in which the first RAT is a time division duplexed (TDD) RAT and in which transmitting by the second RAT is confined to a receive time of the first RAT.

5. The method of claim 1, in which duplexing is opportunistic.

6. The method of claim 1, in which duplexing is deterministic.

7. An apparatus for wireless communication, comprising:
    a memory storing a program; and
    at least one processor coupled to the memory, the at least one processor being configured to perform the following upon executing the program:
        to measure a transmit power from at least one radio access technology (RAT); and to duplex transmissions of a first RAT with transmissions of a second RAT, such that the first RAT transmits when the second RAT is not transmitting, when the measured transmit powers exceed a value associated with a specific absorption rate (SAR) threshold value and when reducing the transmit power from at least one RAT would result in lower throughput than duplexing the transmissions of the first RAT with the transmission of the second RAT.

8. The apparatus of claim 7, in which the at least one processor is configured to measure by measuring a first transmit power from the first RAT and measuring a second transmit power from the second RAT; and the at least one processor is configured to duplex by duplexing transmissions of the first RAT with transmissions of the second RAT when a sum of the measured transmit powers exceeds the specific absorption rate (SAR) threshold value.

9. The apparatus of claim 7, in the at least one processor is configured to duplex by time division duplexing.

10. The apparatus of claim 9, in which the first RAT is a time division duplexed (TDD) RAT and in which transmitting by the second RAT is confined to a receive time of the first RAT.

11. The apparatus of claim 7, in which the at least one processor is configured to opportunistically duplex.

12. The apparatus of claim 7, in which the at least one processor is configured to is deterministically duplex.

13. A computer program product for wireless communication in a wireless network, said computer program product comprising:

a non-transitory computer-readable medium storing non-transitory program code which when executed by a processor performs the following:

measuring a transmit power from at least one radio access technology (RAT); and duplexing transmissions of a first RAT with transmissions of a second RAT, such that the first RAT transmits when the second RAT is not transmitting, when the measured transmit powers exceed a value associated with a specific absorption rate (SAR) threshold value and when reducing the transmit power from at least one RAT would result in lower throughput than duplexing the transmissions of the first RAT with the transmission of the second RAT.

14. The computer program product of claim 13, in which the measuring comprises measuring a transmit power from at least one radio access technology (RAT); and in which the duplexing further comprises duplexing transmissions of the first RAT with transmissions of the second RAT when the measured transmit powers exceeds a value associated with a specific absorption rate (SAR) threshold value.

15. An apparatus for wireless communication, said apparatus comprising:

means for measuring a transmit power from at least one radio access technology (RAT); and means for duplexing transmissions of a first RAT with transmissions of a second RAT, such that the first RAT transmits when the second RAT is not transmitting, when the measured transmit powers exceed a value associated with a specific absorption rate (SAR) threshold value and when reducing the transmit power from at least one RAT would result in lower throughput than duplexing the transmissions of the first RAT with the transmission of the second RAT.

16. The apparatus of claim 15, in which the means for duplexing is opportunistic or deterministic.

* * * * *